United States Patent [19]

Reswick

[11] Patent Number: 4,741,546

[45] Date of Patent: May 3, 1988

[54] TORQUE RESPONSIVE AUTOMATIC BICYCLE TRANSMISSION

[76] Inventor: James B. Reswick, 1003 Dead Run Dr., McLean, Va. 22101

[21] Appl. No.: 6,155

[22] Filed: Jan. 23, 1987

Related U.S. Application Data

[60] Continuation-in-part of Ser. No. 823,463, Jan. 28, 1986, Pat. No. 4,652,250, which is a division of Ser. No. 593,928, Mar. 27, 1984, Pat. No. 4,608,034.

[51] Int. Cl.$^4$ .......................... B62M 9/08; F16H 9/10
[52] U.S. Cl. .................................... 280/236; 280/261; 474/52
[58] Field of Search ............... 280/236, 238, 260, 261; 474/49, 50, 52, 53, 56

[56] References Cited

U.S. PATENT DOCUMENTS

| | | | |
|---|---|---|---|
| 616,630 | 12/1898 | Pratt | 474/50 |
| 672,962 | 4/1901 | Seymour | 474/56 X |
| 698,854 | 4/1902 | Pratt | 474/53 |
| 2,004,224 | 6/1935 | Silber | 474/50 |
| 3,661,024 | 5/1972 | Cooke | 474/56 |
| 3,926,020 | 12/1975 | Dantowitz et al. | 280/238 |
| 3,935,751 | 2/1976 | Lee | 474/50 |
| 3,956,944 | 5/1976 | Tompkins | 474/50 |
| 3,969,948 | 7/1976 | Pipenhagen, Jr. | 474/50 |
| 3,972,244 | 8/1976 | Bieser et al. | 474/56 |
| 3,995,508 | 12/1976 | Newell | 474/56 X |
| 4,119,326 | 10/1978 | Porter | 280/236 |
| 4,259,874 | 4/1981 | Guirrec | 474/56 |
| 4,325,702 | 4/1982 | Jacobsson et al. | 474/56 |
| 4,342,559 | 8/1982 | Williams | 474/49 |
| 4,373,926 | 2/1983 | Fullerton | 474/56 |
| 4,634,406 | 1/1987 | Hufschmid | 474/49 |

Primary Examiner—John J. Love
Assistant Examiner—Donn McGiehan
Attorney, Agent, or Firm—Fay, Sharpe, Beall, Fagan, Minnich & McKee

[57] ABSTRACT

An automatic transmission for use on a bicycle is mounted on a bracket that is connected to the rear axle of the bicycle. A first chain connects the chain wheel with a sprocket fixed for rotation with the drive pulley of the transmission. A second chain transmits power from a sprocket fixed for rotation with the driven pulley to the rear wheel hub sprocket. A V-belt is used to transmit power between the drive and driven pulleys. Once a predetermined input torque is reached during pedalling, the transmission automatically changes the speed ratio between the chain wheel and the driven rear wheel of the bicycle. The gear ratio continues to change automatically and steplessly in response to increasing torque through the entire range of gear ratio change, which is approximately equal to the range provided by a standard ten speed bicycle.

14 Claims, 8 Drawing Sheets

TORQUE RESPONSIVE AUTOMATIC BICYCLE TRANSMISSION

BACKGROUND OF THE INVENTION

This application is a continuation-in-part of application Ser. No. 823,463, filed Jan. 28, 1986, now U.S. Pat. No. 4,652,250, which is a divisional application of Ser. No. 593,928, filed Mar. 27, 1984, now U.S. Pat. No. 4,608,034.

1. Field of the Invention

This invention relates to a variable speed ratio transmission that is used in the transmission of power between a motor, for example an engine or a person, and an output shaft. The speed of the output shaft varies automatically in response to load demand such that an infinite number of speeds between the minimum and maximum are available. The transmission of the present invention includes the use of a flexible belt for transmitting rotary motion between a driving shaft or drive pulley, hub and sprocket unit rotatably mounted on a fixed shaft and a driven shaft or driven pulley, hub and sprocket rotatably mounted on a fixed shaft.

This device is intended to be used on, but not limited in application to, any number of low horsepower device such as bicycles, golf carts, machine tools, preferrably wheelchairs. Also, any machine or vehicle that is required to deliver varying torques at varying speeds is suitable for the application of the present invention.

In particular, the invention relates to a stepless automatic transmission for use with bicycles. The automatic transmission takes the place of derailleurs and is mounted to the bicycle frame adjacent the rear wheel. The transmission changes the output speed ratio in accordance with load encountered as the cyclist rides the bicycle uphill, or against the wind.

2. Description of the Prior Art

One of the best known devices for accomplishing variable-speed transmission through the use of a belt is the Reeves variable speed transmission. Other efforts to achieve speed change include transmissions comprising pulleys that have peripheal belt or chain engaging surfaces that expand and contract radially. U.S. Pat. No. 672,962 discloses this type of prior art device.

U.S. Pat. Nos. 616,630 and 698,854, issued to J. C. Pratt, disclose transmissions having variable speed change. Variable speed ratio transmission of the prior art that include expanding pulleys do not provide a very large change in speed ratio between the minimum and maximum value. The devices of the prior art are complex and require a large assembly of parts. Also, some of the larger, more efficient transmissions are inadequate for application in low horsepower devices. application in low horsepower devices.

One problem shared by all belt drive transmissions is the tendency for the belt to slip. The problem is more difficult to overcome when the transmission includes an expanding pulley. Lee, in U.S. Pat. No. 3,935,751, discloses the use of an idler pulley that is spring biased for tightening the belt. The addition of an idler pulley is not advantageous since there is an additional power transmission loss due to friction. Also, the added friction results in additional belt wear. Another method of solving the problem includes using two expanding pulleys that are spring biased in opposite rotational directions as taught by Pratt.

Automatic transmissions for chain driven bicycles are known, as disclosed in U.S. Pat. Nos. 3,956,944, 3,969,948, 3,995,508, and 4,373,926. In each of these transmissions, the effective diameter of a chain-engaging sprocket is changed as the chain-engaging elements shift position inwardly and outwardly. As the circumferential distance between the chain-engaging elements changes, a problem arises in keeping the chain in mesh with the elements. In recognition of this problem, many of the automatic bicycle transmissions use a sprocket wheel having a plurality of smaller individual sprockets that engage the chain. Each of the smaller sprockets in turn include one-way clutches for allowing rotation of the smaller sprockets in one direction while preventing rotation in the driving direction. Also, since only one sprocket wheel assembly is used, a chain tensioning idler gear is provided. In U.S. Pat. No. 4,373,926, however, the need for an idler gear is obviated by using two transmissions, one at the driving source of pedal crank, and the other at the driven member of rear wheel. This requires not only the complete modification of the pedal crank assembly, but also the modification of the rear wheel hub assembly.

A variable drive bicycle transmission that includes a spring loaded variable pitch sheave that is driven by the pedal sprocket by way of a chain is disclosed in U.S. Pat. No. 3,972,244. A V-belt couples the variable pitch sheave to a fixed sheave, which is connected to the hub sprocket of the rear wheel by another chain. As the pedal torque is increased, the V-belt tension is increased and the variable pitch sheave expands to thereby shift down the transmission automatically. To maintain belt tension, the variable pitch sheave is mounted to move along a slot in a guide plate, thereby changing the center-to-center distance between the variable pitch and fixed sheaves while maintaining a fixed distance between the variable pitch sheave sprocket and pedal wheel sprocket. The fixed and variable sheaves are mounted on the frame of the bicycle above the pedal wheel sprocket. This is undesirable since the cyclist must constantly be careful not to interfere with the transmission. Particularly, the cyclist is in danger of having his clothing caught in one of the sheaves, or on one of the chains which could lead to an accident but at the very least distracts the cyclist's attention on riding the bicycle safely.

SUMMARY OF THE INVENTION

It is an object of this invention to overcome the disadvantages of the prior art variable speed ratio transmissions.

It is a further object to provide a variable speed ratio transmission that has increased speed ratio change between the minimum and maximum values.

Another object of this invention is to provide an automatically varying speed ratio transmission for belt drives, wherein the belt tension is maintained during the speed changing operation.

It is an object of this invention to improve upon the devices of the prior art by providing an assembly that is light in weight, solid in construction, and capable of high transmission efficiency, while still being reliable, simple to manufacture, and easy to maintain with only minimal maintenance requirements.

It is a further object of this invention to provide a variable speed transmission that permits the use of smaller motors requiring less electrical power, and a control system that uses fewer electrical components.

Components of the present invention may replace structurally similar components in any application where conventional "V" belts and the like are used and wherein operation of the device ranges between high speed at low torque and low speed at high torque.

A transmission constructed according to a preferred embodiment of the present invention comprises a drive pulley and a driven pulley having a V-belt passed in a continuous band over each pulley. The drive pulley is constructed on a number of arms pinned to a central spool or hub that is in turn fixed to a shaft. Each arm is nearly identical in shape, having a radially extending arcuate portion and a curved face having a V-belt engaging groove therein. When collapsed, the arms nest together to form a typical V-groove pulley having a minimum effective diameter. As the pulley expands from the collapsed or nested position, each arm is guided by a radially extending slot or groove of an adjacent and co-planar disc that is free to rotate relative to the shaft. The arms are guided by the slots by means of pins in each of the arms.

The driven pulley of the present invention is similar in construction to the drive pulley. The drive pulley is spring biased outwardly toward a maximum expanded position. The driven pulley is not spring biased because the driving torque causes the arms to expand to whatever diameter is required to maintain belt tension. This provision of maintaining proper belt tension is provided by the novel aspects of the invention as disclosed herein.

The arm construction for each pulley is the same. However, the arms curve outwardly in opposite direction with respect to the direction of the torque applied to the pulleys. Smooth operation is maintained during the speed changing operation by the novel aspects of the expanding arms. Each curved face portion contacts the belt during one revolution of the pulley. For the nested position, full peripheral contact between the face portions and the belt are made. As the pulley expands, however, only partial contact is maintained. The area of contact along the curved face shifts from one side of the face to the other. This shifting provides for the advantage of only minimal changes in curvature for the overall pulley periphery as it expands and contracts. Additionally, the area of contact can be represented by a geometrically central point. The distance from this point to the axis of rotation defines the effective pulley radius. At the fully expanded positions, the central point of contact is furthest away diagonally from the pivot point of the arm thereby maximizing the length of the arm. Leading and trailing edges of the faces are rounded to smoothly engage and disengage the belt.

It is an object of the present invention to provide a transmission that senses an increased load present during a high load condition and that automatically increases torque to the output, while only moderately increasing the input torque and reducing the input speed. It is an object of this invention, therefore, to provide a transmission to enable a motor to continuously operate at a reasonably high efficiency, or a person to power a human powered device at low speed and high torque to produce a high speed and low torque output.

It is an object of the invention to provide a fully automatic variable speed ratio transmission for bicycles that changes its speed ratio in response to an increase in torque applied to the transmission through the pedals by a chain engaging the pedal sprocket and a sprocket fixed for rotation with the drive pulley. The spring bias of the drive pulley is preset so that the transmission changes speed ratio when a predetermined torque is applied to the pedals, as when the cyclist begins to travel up a hill.

It is an object of the invention to provide an automatic transmission wherein the spring bias of the drive pulley is readily adjustable by changing the force of the springs used to spring bias the drive pulley. The side plates of the drive pulley are provided with a series of notches located along the periphery of each plate. A helical spring having opposite ends is anchored at its one end to the hub of the drive shaft and at its other end has a bent-end portion for engaging a selected one of the notches. This adjustable biasing feature allows cyclists of differing weight and experience to adjust the predetermined changeover torque in accordance with their own requirements. Therefore, it is an object to provide an automatic bicycle transmission that has an adjustable speed ratio change torque so that one standard transmission unit can be manufactured to accommodate a wide range of cyclists.

It is an object of the invention to provide a variable speed transmission having variable diameter drive and driven pulleys including a flexible transmission belt, that can be mounted on a bracket having a two-point connection to a standard bicycle frame and thus marketed as an easily installable separate unit for bicycles. To install the transmission on a bicycle, the main chain from the pedal sprocket is drivingly connected with a sprocket fixed to the drive pulley of the transmission. An auxiliary chain is then drivingly connected between a standard rear wheel hub sprocket and a sprocket fixed for rotation with the driven pulley. The bracket supporting the drive and driven pulleys includes a slot for receiving the threaded end portion of the axle so that the bracket is connected to the frame by a nut tightened onto the threaded axle portion. To complete the installation of the transmission on the bicycle, a stabilizer bar is connected between a frame member of the bicycle and an extended portion of the bracket. The chains are tightened by pulling the axle and bracket assembly rearwardly as is usually done in tightening the main chain, and by also pulling the bracket downwardly, which movement is allowed by the slot through which the axle extends to tighten the auxiliary chain. Thus, the main chain passes over the rear axle, around the drive pulley sprocket, and under the rear axle in addition to passing around the pedal sprocket. No idler gear tensioning devices are necessary for either of the chains, or is a belt-tensioning device necessary for the belt engaging the drive and driven pulleys. Since the main driving force of the pedal stroke is transmitted rearwardly to the driven pulley, the axis of rotation of the driven pulley, along with the axis of rotation of the rear axle and rear wheel hub sprocket are aligned co-linearly with the axis of rotation of the pedal sprocket by a line that perpendicularly intersects all three axes of rotation.

It is an object of the invention to maximize the efficient use of the helical springs which provide the biasing torque that biases the arms of the drive pulley outwardly until the input torque of the drive shaft exceeds a predetermined value. Once the predetermined torque value is reached, the drive pulley contracts and the driven pulley correspondingly expands. A change in speed ratio then results. The percent decrease of the diameter of the drive pulley, however, is less than the percent increase of the driven pulley. Therefore, the speed ratio drop is not linear unless the guide slots in the plates or disks are curved for the drive pulley. By curving the guide slots, a more linear relationship is achieved. The result is that when the predetermined pedal force is reached and the speed ratio begins to drop, the springs are compressed more quickly when the ratio change first takes place. Also, an increase in the value of input torque necessary to achieve the most fully contracted position of the drive pulley can be obtained by angularly displacing the inner end of the slot in relation to the outer end.

DETAILED DESCRIPTION OF THE DRAWINGS

Figure 1:
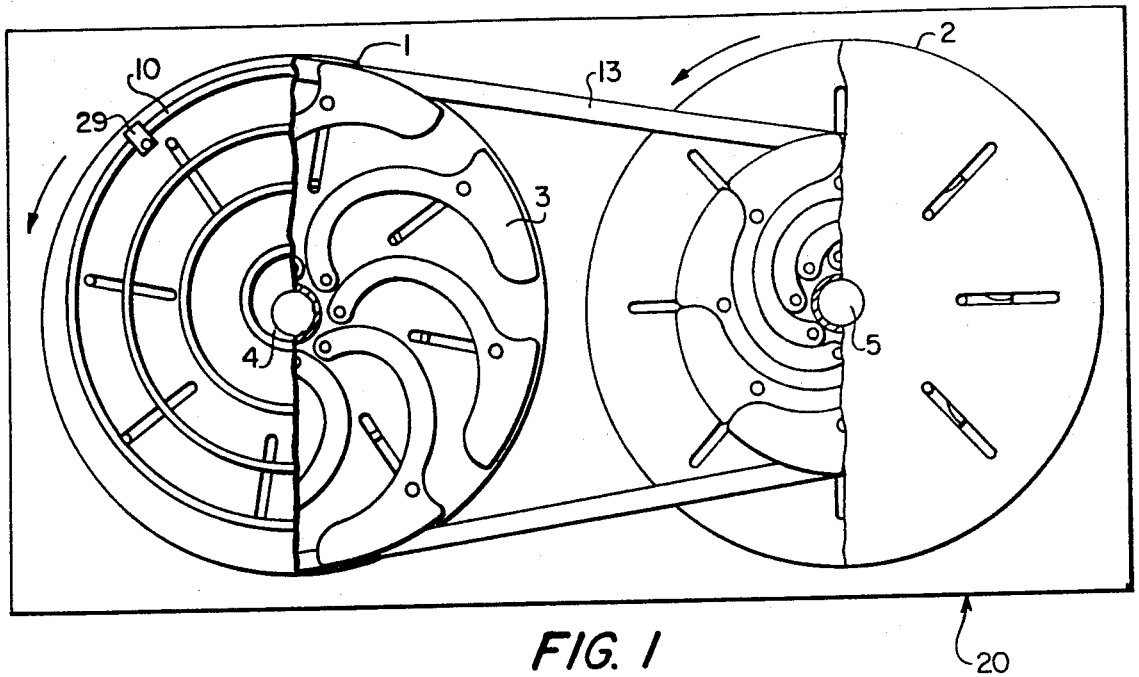
FIG. 1 is a side view illustrating the transmission comprised of a drive and a driven pulley each cut away along one diameter of the respective pulleys.

In FIG. 1, 20 generally designates one embodiment of a variable speed transmission constructed according to this invention. A drive pulley 1 is drivingly connected to a driven pulley 2 by means of a continuous flexible V-belt 13.

Figure 2:
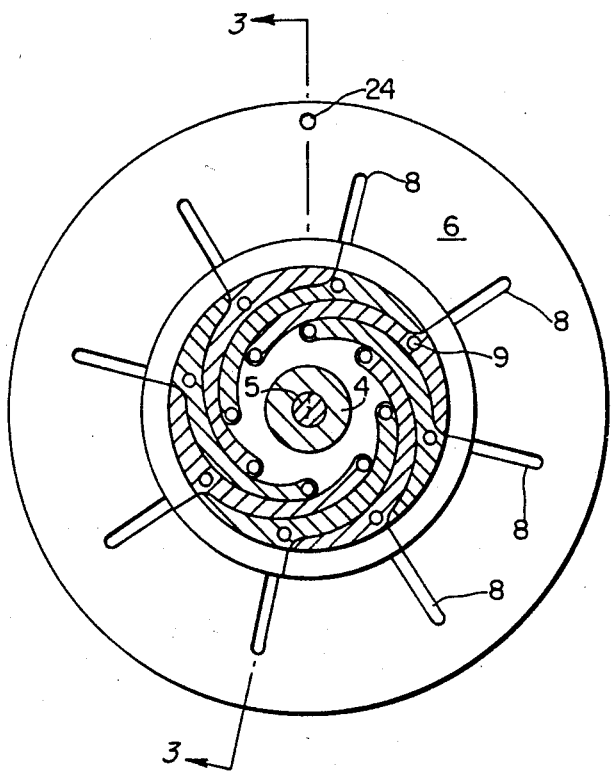
FIG. 2 is a sectional view of one of the pulleys of FIG. 1 and corresponding to line 2—2 of FIG. 3.
Figure 3:
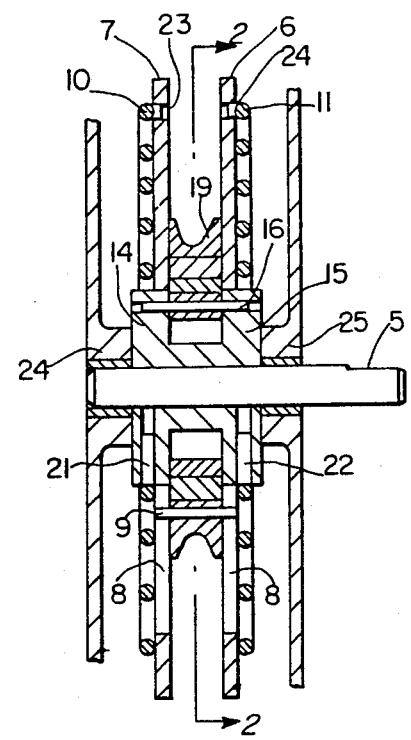
FIG. 3 is a cross-section view taken along line 3—3 of FIG. 2.

As seen in FIG. 1 and also with respect to FIGS. 2 and 3, each pulley generally comprises an inner hub or spool 4 that is fixed to a shaft 5. As seen in FIG. 2, each pulley is comprised of a plurality of arms 3. Together the arms form a composite solid pulley body that is expandable to form an expanded segmented pulley body as shown in the left half of FIG. 1. Spool 4 further includes two radially extending annular flanges 14 and 15. Pins 16 extend part way into each flange 14 and 15 for pivotally supporting arms 3.

Figure 4:
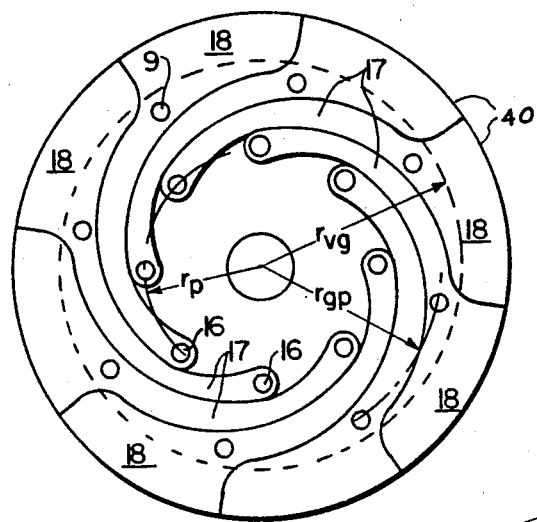
FIG. 4 is a side view showing the arm configuration of the pulley with certain details of the structure not shown.
Figure 5:
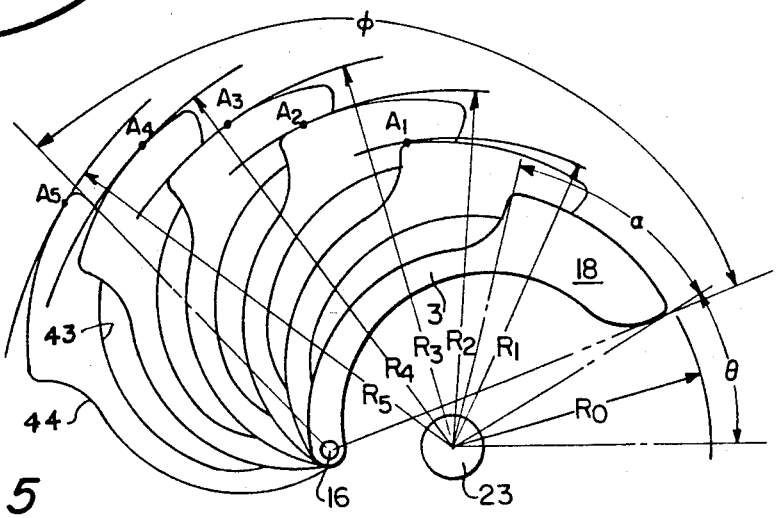
FIG. 5 illustrates several intermediate positions of one pulley arm as it expands between the collapsed position and the fully expanded position.

Each arm 3 has a radially extending arcuate portion 17 and a head or end portion 18, as seen in FIG. 4. Each portion 18 has an outer or peripheral curved face 40 that includes V-shaped groove 19, as shown in FIG. 3, for receiving V-belt 13. Arms 3 further have axially opposed planar surfaces, only one of which can be seen in FIG. 4. The inner and outer edges of the arms 43 and 44, are best shown in FIG. 5.

With reference to FIG. 3, two plates or discs 6 and 7 are mounted for free relative rotation with respect to spool 4, engaging flanges 14 and 15. One of the plates 6 can be seen in FIG. 2. Radially outwardly extending slots 8 are shown extending through plate 6. The slots 8 receive guide pins 9 that project outwardly from the axially opposed surfaces of arms 3. Slots 8 are evenly angularly spaced and the total number of slots at least corresponds to the number of arms that comprise the pulley. As seen in FIG. 3, slots 8 extend completely through plates 6 and 7, however, the slots need only be deep enough to provide a groove that pins 9 can slide in. As the arms pivot outwardly, the guide pins 9, being received in slots 8, maintain an even spacing between each of the arms. Also, the pins maintain an equal radial spacing from the axis of rotation of shaft 5. For the drive pulley only, plates 6 and 7, slots 8, and pins 9 also function at certain times to transmit torque as will be hereinafter explained.

Spiral springs 10 and 11 are anchored to flanges 14 and 15 of spool 4 within bores 21 and 22. At their other end, springs 10 and 11 are anchored by holes 23 and 24 respectively in discs 6 and 7, hole 24 being seen in FIG. 2. Driven pulley 2 is constructed nearly identically to pulley 2 for reasons to be hereinafter explained.

A transmission employing of drive pulley constructed according to the embodiments of this invention is capable of automatically varying its speed-ratio in response to a sensed load condition. Initially, the drive pulley 1 is in a fully expanded position. Springs 10 and 11 are preset to apply a predetermined bias torque or force that causes plates 6 and 7 to rotate (counter clockwise as seen in FIG. 1) with respect to spool 4. This causes the arms to pivot outwardly, the arms being guided by pins 9 in slots 8. The outermost position is limited by the length of the belt and the center distance between the pulleys and not by any mechanical stops.

The predetermined spring force is chosen so as to permit the drive motor to operate in its best efficiency range without speed ratio change. In the case of a permanent magnet direct current motor, this is approximately the lower 30-40% of its torque range. As the load increases, a point is reached at which the torque on the drive pulley is enough to overcome the preset tension of the springs 10 and 11. The direction of curvature shown in FIG. 1, with respect to the direction of rotation shown by the arrow, allows the arms to pivot inwardly as the load transmitted by the belt increases. If the load is great enough, this continues until the pulley is fully contracted. In the fully contracted position, the arms contact one another along their adjacent peripheries. Further, each portion 18 abuts an adjacent portion 18 in an end-to-end manner so that a fully circular pulley face is formed-broken only by the small spaces between each arm.

A transmission employing a driven pulley constructed according to the embodiments of this invention is capable of varying is diameter in response to changes in diameter of the drive pulley between a fully contracted position and a plurality of expanded positions. Such a transmission can be constructed with a drive pulley of any known expanding type in which the pulley diameter decreases in response to a sensed load. Preferably, the drive pulley is constructed according to the embodiments of this invention as shown in FIG. 1.

The driven pulley responds to increase its diameter in proportion to a decrease in diameter of the drive pulley. This is caused by the action of a belt pulling force pulling on arms 3 in a sense that tends to constantly urge the arms to pivot outwardly. The force is transmitted through frictional engagement of the belt with the arms and the tendency for the arms to pivot outwardly is caused by the direction of curvature of the arms with respect to the direction of the torque applied by the belt. In FIG. 1, it is seen that the belt applies a torque in the direction of the arrow shown, thus urging the arms of the driven pulley to pivot outwardly. The arms of the driven pulley are allowed to pivot outwardly with guidance of plates 6 and 7 rotating with respect to spool 4. They can pivot outwardly as far as it is necessary in that there are no mechanical stops preventing the outward movement of the arms.

When the torque of the load is decreased and the drive pulley diameter again expands, the driven pulley is caused to contract by the same force that causes the drive to expand. In the transmission of FIG. 1 the force is produced by springs 10 and 11 and this force is transmitted to the driven pulley through the belt. Since no springs are present in the driven pulley construction, the arms of the driven pulley pivot inwardly in response to the force transmitted by the belt from the drive.

In a preferred embodiment, a transmission of this invention employs both a drive pulley constructed according to this invention and a driven pulley constructed according to this invention.

Transmission of power in the drive pulley begins with a drive torque exerted on shaft 5. This power is transmitted through springs 10 and 11 to plates 6 and 7. Then power transmission continues through slots 8 to pins 9 or arms 3. The springs act as a transmission element in series with the shaft and the arms. As the pulley contracts, power is still transmitted through the spring. When the drive pulley is in the contracted position it transmits power, not through the springs but through the hub. In the contracted position the drive pulley transmits power much in the same way a solid pulley does.

Transmission of power is different for the driven pulley. The arms 3 pinned to hub 4 always act to transmit the power to the hub and hence to the output shaft. For the driven pulley, the plates 6 and 7, and pins 9 in slots 8 transmit no working power for the pulley. These elements serve to only guide the pulley arms in pivotal movement inwardly and outwardly.

Therefore, pins 9 are referred to as guide pins, but for the drive pulley they also act to transmit power from the shaft to the arms when the pulley is in any of its expanded positions. Also, this is not to say that no force is transmitted to the hub from the pivot connections of the arms when the drive is in the expanded positions. This merely states that no working force is transmitted through the pivot connections until the drive contracts and the arms contact one another along their adjacent peripheries.

An initial minimum belt tension is provided by springs 10 and 11. This pulls the belt tightly against the driven pulley that is fully contracted or in a nested position. When the speed change occurs, the torque of springs 10 and 11 is overcome and the arms of the drive pivot inwardly. As this takes place the belt pulls at the individual arms 3 of the driven pulley. This is achieved through a belt pulling force that acts upwardly from the bottom of the driven pulley in a circular direction toward the top of the driven pulley. This tendency for the belt to pull arms 3 upwardly causes the arms to pivot outwardly.

Referring to the transmission of FIG. 1, for the direction of rotation opposite to that of the direction shown by the arrows, no torque speed conversion is achieved. However, the initial belt tension permits the system to transmit power in the opposite rotational direction as the torque directions in the rotational condition in combination with the direction of curvature of the arms in the drive and driven pulleys tend to expand drive pulley 1 and to maintain driven pulley 2 in a contracted or nested position. This tendency of the driving torque to expand the drive pulley ensures that the belt does not slip when operating in the opposite rotational direction.

Figure 9:
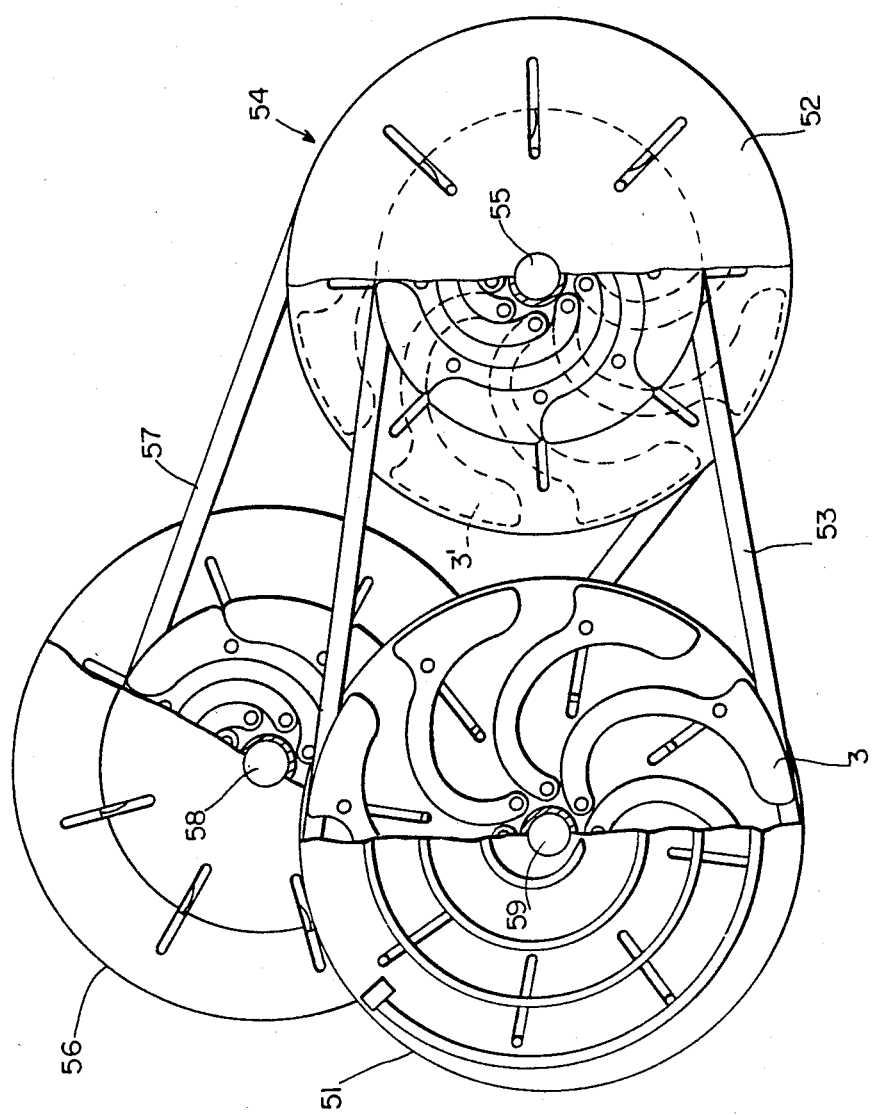
FIG. 9 shows a side view of two transmission pairs operable to provide automatic variable speed in either rotational direction.

In FIG. 9, a transmission of another embodiment is constructed according to this invention. In this transmission, the direction of rotation is the same as in FIG. 1 and each pulley component part is structurally similar to the pulleys detailed in FIGS. 2 and 3 wherein the drive pulleys include springs and the driven pulleys do not. A first drive pulley 51 is connected for rotary transmission to a first idler or driven pulley 52 by means of a V-belt 53. A second drive pulley 54 is fixed to a shaft 55 that is common to both pulleys 52 and 54. Drive pulley 54 has arms 3' shown by dotted lines, arms 3' being oriented oppositely to arms 3. Only pulley 52 can be seen in FIG. 4. Shaft 55 is mounted for rotation by suitable means not shown. Pulley 54 is connected for rotary transmission to output pulley 56 by means of a second V-belt 57. Pulley 56 is mounted on a shaft 58 that is intended to provide the output torque as it is transmitted originally from shaft 59, on which pulley 51 is mounted.

In the operation of the transmission constructed according to FIG. 9, pulleys 51 and 52 act as pulleys 1 and 2 do in FIG. 1 to provide a change in speed ratio, while the pulleys 54 and 56 transmit rotary motion at a fixed speed ratio. In the reverse direction, pulleys 54 and 56 act to automatically change the speed ratio as pulleys 51 and 52 previously did. In the reverse direction, pulleys 51 and 52 transmit speed at a fixed speed ratio in that the pulley arms of pulley 52 will be in a completely collapsed position and the pulley arms of pulley 56 will be in a completely expanded position. Therefore, speed-torque conversion is provided in both rotational directions for shafts 58 and 59.

In FIG. 4, the geometry of each pulley used in the transmissions constructed according to the embodiments of the invention is shown. $r_{vg}$ indicates the radius of a circle joining the depths of the V groove in each heat portion 18 of arms 3. $r_{gp}$ shows the radius of a circle that joins the central point of each guide pin 9. $r_p$ shows the radius of a circle that joins the central point of pins 16.

In FIG. 5, points $A_1$-$A_5$ show the central points of contact of a V-belt with the arms as the arms move from the collapsed position through several intermediate positions to the fully expanded position. It can be seen that each point $A_1$ through $A_5$ is tangent to a circle having its origin at 23. The maximum pulley diameter is indicated by radius $R_5$ and the minimum pulley diameter is indicated by radius $R_o$. Theta indicates the initial angular displacement of head portion 18 from a line intersecting point 16 of arm 3 with the axis of rotation of the pulley. Alpha indicates the angular fraction of a full circle that each head portion 18 of an arm 3 subtends. Phi indicates the angle through which head portion 18 extends from the nested position to the fully extended position as measured from the point of rotation at 16. In a preferred embodiment of this invention, phi equals approximately 115 degrees.

In the preferred embodiment $r_p$ equals (0.47) $R_0$, and ($R_5/R_0$) equals (1.8). Also, theta equals 30 degrees. For the preferred pulley construction having eight arms, alpha equals 45 degrees.

According to the improved pulley construction provided by this invention, for each intermediate position of an arm 3 as it pivots outwardly from the collapsed position to the expanded position, a central point of tangency is maintained along the outer peripheral rim of head portion 18. Since this point of tangency shifts gradually across the outer peripheral rim portion of head 18 from left to right as viewed in FIG. 5, sudden changes in curvature are minimized. Also, a significant increase in speed ratio change is provided by the solid construction of the arms, specifically in combination with the solid interconnection of the semi-circular face portions 18 with the radially extending arcuate portions 17. FIG. 5 clearly shows that an arm in a first position (having radius $R_1$) has a central point of contact (point $A_1$) with the belt that is diagonally nearest to the arm's pivot point 16. As the arm pivots outwardly the central point of contact shift along the periphery of the curved face to the diagonally furthest point, $A_5$, from pivot 16. In theory, the arm could support the belt at the corner of the V groove nearest point $A_5$ if the arm were allowed to pivot for a value of phi equal to 180 degrees. It can be seen from the figure that a smaller diameter pulley would be formed if the belt were in contact with the middle point of portion 18 rather than contact point $A_5$. This increase in maximum pulley diameter results in a 4% to 5% overall diameter increase per pulley.

For low horsepower applications, arms 3 can be constructed of any suitable plastic material or lightweight metal such as aluminum or an alloy thereof. In the preferred embodiment, eight arms are used such that portions 17 of arms 3 are sufficiently thick to support the component of belt force that is directed toward the pivot point 16. Theta, shown in FIG. 5, could be decreased at the expense of thinning portions 17 and lengthening those portions also. This would permit an increase in phi. The benefit in maximizing phi is realized in a greater speed ratio change; and in minimizing the angle phi, a greater ability for the arms to transfer the applied torque without excessive stress to portions 17 of the arms.

Each of the pulleys in FIGS. 1 and 9 are constructed similarly with identical arms and plates. The hub designs of the drive and driven pulleys differ in detail to account for the springs on the drive pulley and lack of springs on the driven. The springs serve to retain the plates on the drive pulley while alternative well-known means are used to retain the plates on the driven.

Although a V-belt has been disclosed throughout the prior discussion, a properly guided flat, round, or other shape belt may be used as determined by power transmission requirements. Additionally, arms may be constructed with multiple belt grooves and multiple belts used to transmit higher power than could be accomplished with a single belt.

Figure 6:
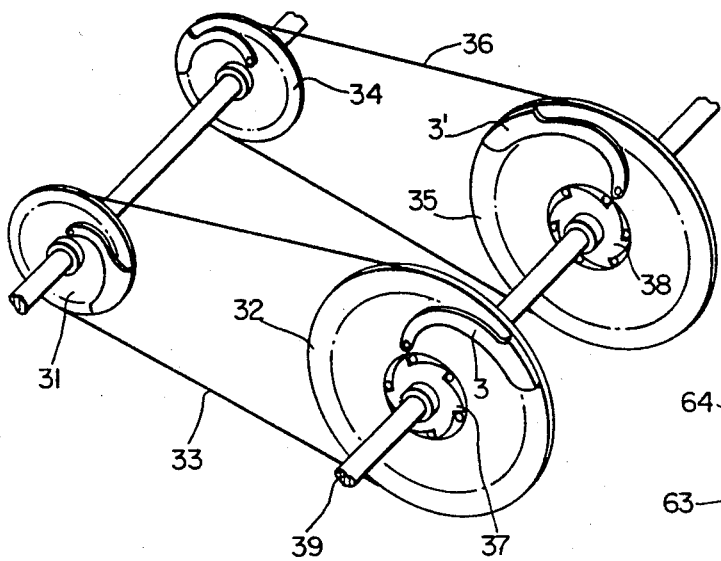
FIG. 6 shows a perspective view of two transmission pairs constructed according to the invention, and operable to provide automatic variable speed in either rotational direction.

In FIG. 6, the use of two pairs of pulleys is shown so that speed change in the reverse direction is also possible. A first pair of pulleys 31 and 32 have a first V-belt 33 passing over them. A second pair of pulleys 34 and 35 are similarly connected by a V-belt 36. Pulleys 32 and 35 are connected to the drive shaft through over-running clutches. The elements of the first drive pulley 32 are in mirror image with the elements of the second drive pulley 35. This is indicated by the reversely oriented over-running clutches 37 and 38 and the reversely oriented arms 3 and 3' of the drive pulleys. In the forward direction clutch 37 engages and pulley 35 can rotate at only the same or slower speed than pulley 32 and will therefore overrun freely. Pulleys 31 and 32 will provide variable speed in a forward direction. In the reverse direction, clutch 38 engages and pulley 32 can rotate at only the same or slower speed than pulley 35 and therefore will over-run freely. Pulleys 34 and 35 will provide variable speed in the reverse direction.

Figure 7:
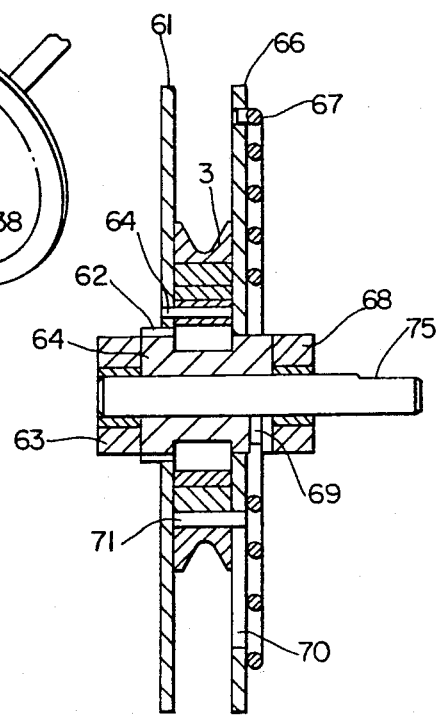
FIG. 7 illustrates another embodiment of a pulley constructed according to this invention.

FIG. 7 shows another embodiment of a pulley in which a shaft 75 is provided. A spool 64 is fixed to shaft 75 and keyed at 62 is a disc 61 that is fixed for rotation with spool 64. A second disc 66 is provided that is mounted on spool 64 for free relative rotation therewith. A spring 67 is anchored at its one end to disc 66 and at its other end to spool 64 in bore 69. Slots 70 are provided in disc 66 for receiving pins 71 that project outwardly from one face of arms 3. The arms are mounted for pivotal movement with respect to disc 61 by pins 64. Collars 63 and 68 function similarly to collars 24 and 25 in FIG. 3.

Figure 8:
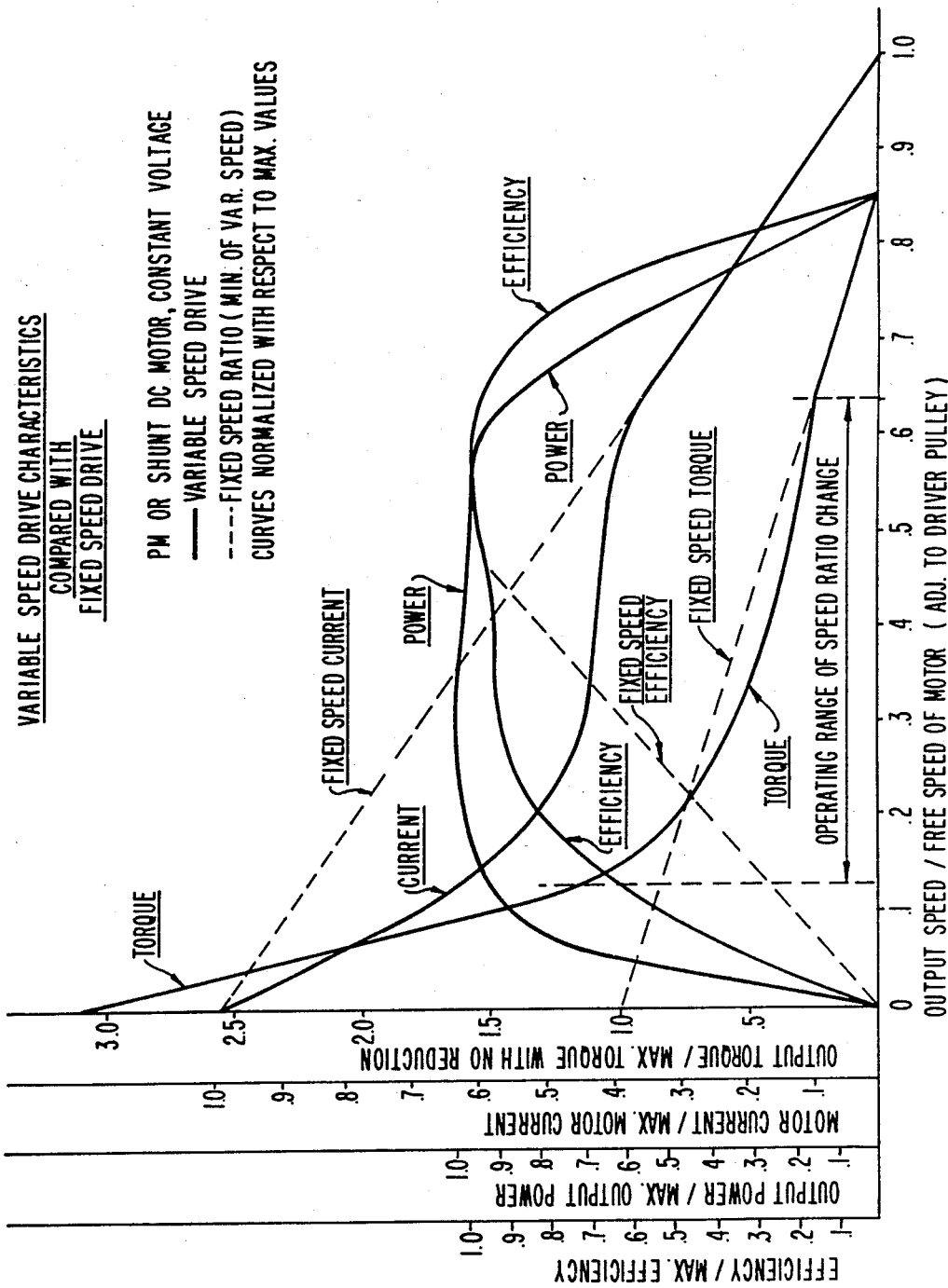
FIG. 8 is a graph of the characteristics of a torque convertor constructed according to the invention as compared with the characteristics of a fixed pulley of normal construction.

FIG. 8 discloses a graph comparing the torque conversion and other characteristics of the transmission constructed according to the present invention with the fixed pulley characteristics of a solid pulley connected according to a known manner. Curves are typical for use of the variable speed drive with a fractional horsepower permanent magnet (or shunt field) direct current motor. Initial spring tension is set to a preload of about 30% of motor maximum torque as measured at the drive pulley and a spring rate is chosen to collapse the drive pulley arms completely at about 80% of maximum motor torque as measured at the drive pulley. All scales are nondimensional being referred to the maximum values of each variable plotted except for torque which is referred to maximum output torque measured at the driven pulleys were initial speed ratio to remain unchanged. Curves were experimentally obtained using an 0.1 horsepower motor. The substantial increase in torque, power, and efficiency at low speeds as compared with the system operating at fixed speed ratio may be observed. Reduced motor current over the normal operating range may also be observed. Lower current and higher efficiency results in smaller electrical components as well as increased performance with the same energy capacity.

Figure 10:
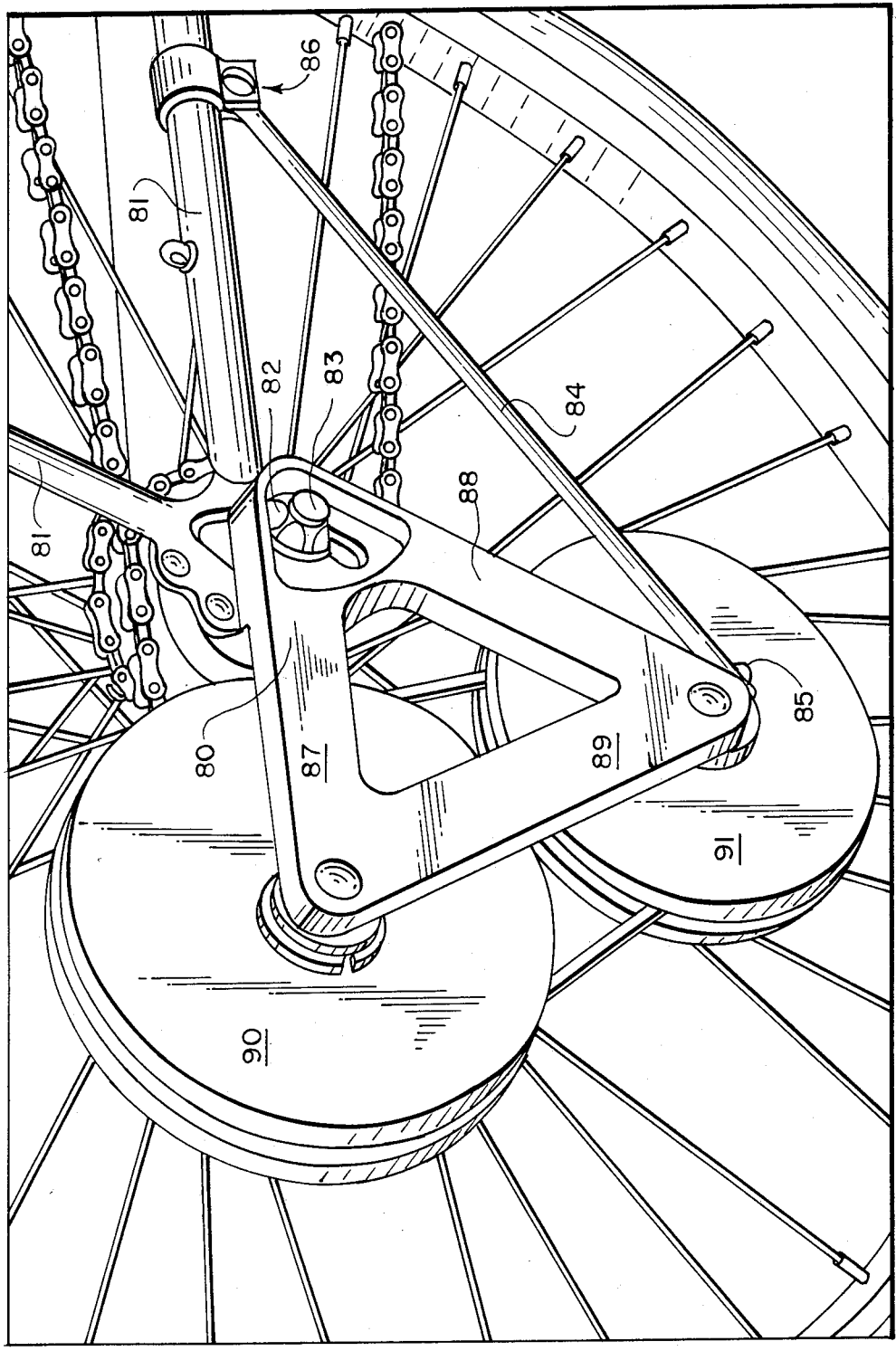
FIG. 10 is a perspective view of a transmission constructed according to the invention mounted on a bracket that is bolted to the rear frame portion of a bicycle in driven interconnected between the pedal driven chain wheel and the hub sprocket of the rear wheel.

With reference to FIG. 10, a transmission constructed according to the invention is shown mounted on a bracket that is in turn bolted to the rear frame portion of a bicycle 81 by a nut 82 engaging a threaded end portion of the rear axle 83. In addition, bracket 80 is supported by a stabilizer bar 84 that is connected at one end to the bracket by a bolt 85 and at the other end to the rear frame portion of the bicycle by a bolt and clamp assembly 86. Bracket 80 is generally triangular in shape and has a first arm portion 87 extending rearwardly from axle 83 and a second arm portion 88 extending rearwardly and downwardly from axle 83. A third arm portion 89 of the bracket interconnects arms 87 and 88 and is directly aligned between drive pulley 90 and driven pulley 91.

Figure 11:
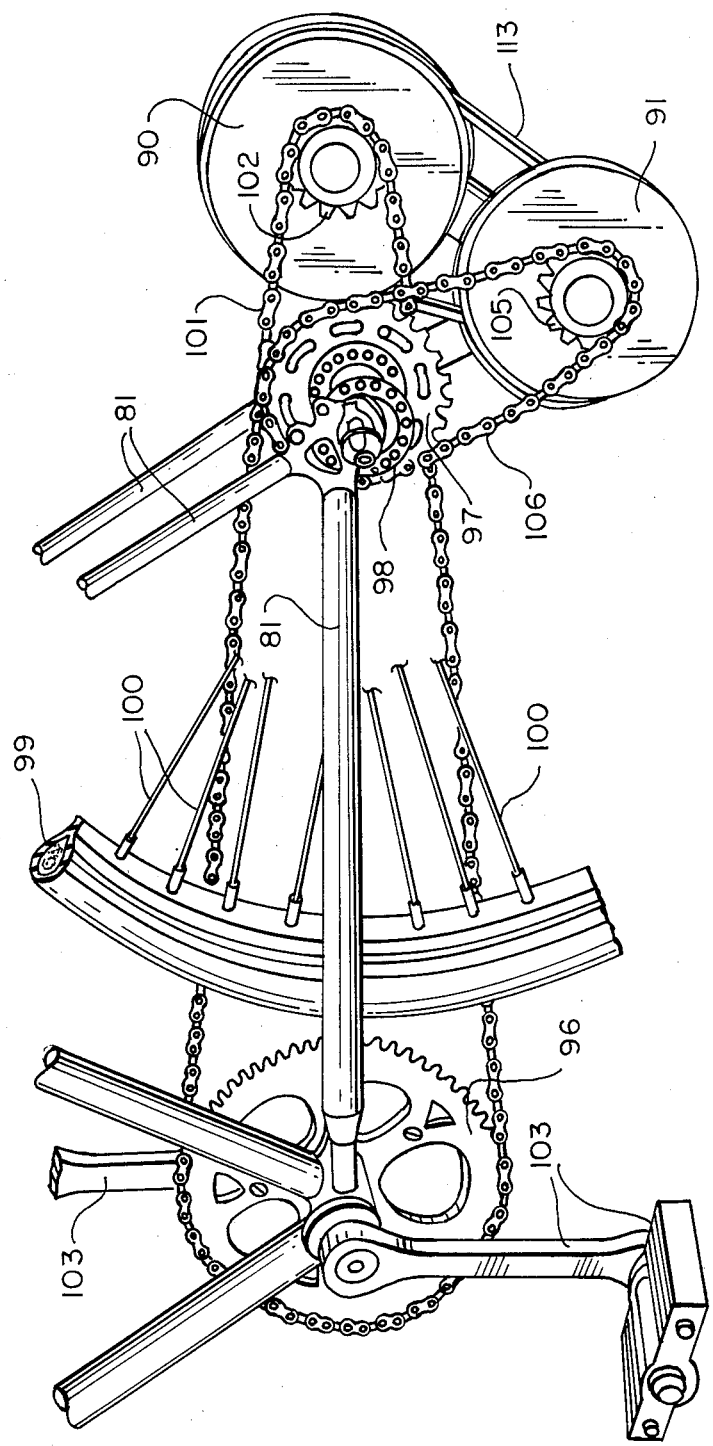
FIG. 11 is a perspective view of a portion of a bicycle frame including the pedal assembly, chain wheel, and rear axle support with the transmission of the invention bolted to the bicycle frame and showing the chain driven interconnection of the transmission with the drive chain of the bicycle.

From a cyclist's view point, FIG. 10 shows a right hand side view of the rear portion of a bicycle with the automatic transmission installed. Conversely, FIG. 11 shows a left hand side view of a bottom portion of a bicycle frame having the automatic transmission installed. For clarity, the hub 98 of rear wheel 99 is shown without the connection between spokes 100 and the hub, which can be connected in any conventional manner.

Drive pulley 90 has a sprocket 102 mounted for fixed rotation therewith and is connected to a chain wheel 96 through a first chain 101. Torque generated by pedal and crank assembly 103 is therefore transmitted to drive pulley 90. Drive pulley 90 transmits this torque to driven pulley 91 through a V-belt 103. Driven pulley 91 has a sprocket 105 mounted for fixed rotation therewith that delivers the output torque to rear wheel hub sprocket 97 through a second chain 106. As a result, the automatic transmission provides speed ratio change between chain wheel 96 and rear wheel 99 automatically in response to the input torque from pedal and crank assembly 103.

The transmission and bracket unit can be manufactured as an off-the-shelf product that is readily installable on a wide variety of conventional bicycles. To install the automatic transmission and bracket unit, no modification is necessary to the crank wheel or frame of the bicycle. For ten-speed bicycles, the conventional five gear sprocket assembly fixed to the hub of the rear wheel can be removed and replaced with a single sprocket. Alternatively, four of the five sprockets can be removed to leave one rear wheel hub sprocket that can be used for drivingly connecting the rear wheel to the output of the transmission.

The reasons for positioning the transmission and bracket assembly rearwardly of rear axle 83 are twofold. First, no structural changes need to be made to the chain wheel nor do any structural components of the transmission need to be attached to the bicycle frame members within the area located between a cyclist's legs. Therefore, the automatic transmission when attached to a bicycle does not interfere with the normal pedaling operation of the bicycle and no risk of interference between the cyclist and the transmission elements is presented by the cyclist's legs. Secondly, the bracket is bolted to the frame using the existing axle for the main point of connection. As a result, the frame of the bicycle does not have to be modified in order to install the transmission. Only the stabilizer bar is attached to a rear frame member of the bicycle through a mechanically simple bolt and clamp assembly 86.

Figure 12:
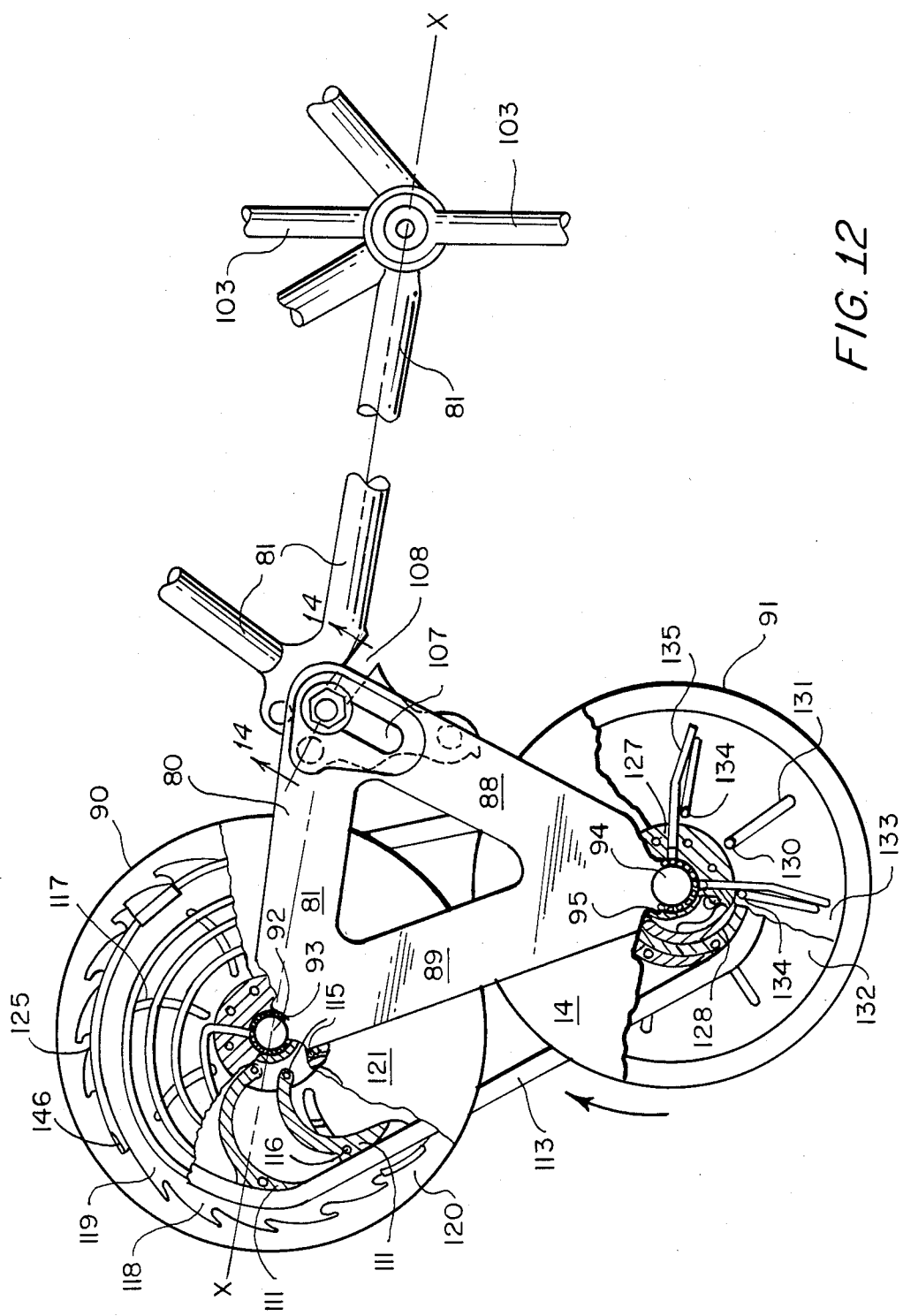
FIG. 12 is a side view of a transmission constructed according to another embodiment of the invention showing the drive and driven pulleys mounted to a bracket that is bolted to the rear frame of a bicycle.
Figure 14:
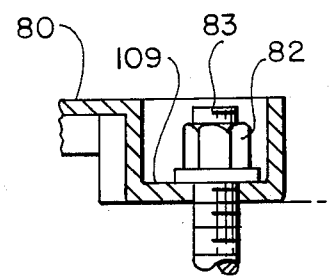
FIG. 14 is a cross-sectional view taken along line 14—14 of FIG. 12.

With reference to FIG. 12, a slot 107 is provided in the bracket through which axle 83 extends. FIG. 14 shows a cross-sectional view through slot 107 taken along lines 14—14 of FIG. 12. Slot 107 is provided in a recess 109 of the bracket and nut 82 is tightened on axle 83 to the rear portion 81 of the bicycle. The slot extends in a direction aligned with fixed shaft 94 about which the driven pulley 91 rotates. This allows tightening of chain 106 by pulling the transmission and bracket unit downwardly away from rear wheel hub sprocket 98. At the same time, the tension in chain 101 can be adjusted by pulling rearwardly the bracket and axle together within a slot 108 that is provided in the frame of the bicycle in accordance with conventional construction.

The torque generated in chain wheel 96 through pedal and crank asesmbly 103 is transmitted to sprocket 102 of drive pulley 90 through chain 101. As shown in FIG. 12, the axis of rotation of the pedal and crank assembly is aligned with the center of rotation of axle 83 and with the axis of rotation of drive pulley 90. This shown by line X—X in FIG. 12. Preferably, line X—X intersects each of the three axes of rotation perpendicularly. With this alignment, the force generated in chain 101 is directed through the chain to the top of the drive pulley sprocket. The line of action of this force is therefore as close to the axle as is practical. Thus, the effect of the torque transmitted through chain 101 which tends to drive the bracket and transmission unit in rotation about axle 83 is brought to a minimum. Stated alternatively, the moment acting on the connection between axle 83 and bracket 80 is minimized when the three axes or rotation are aligned. Stablizer bar 84 is provided to maintain the alignment of the three axes of rotation and to support the bracket against rotation about axle 83 due to any slight misalignment of the axes.

In FIG. 12, a transmission generally indicated by reference numeral 110 is disclosed that is of a different embodiment than the transmission disclosed in FIG. 1. Drive pulley 90 and driven pulley 91 are mounted for rotation on bracket 80.

Drive pulley 90 includes a hub 114 that is mounted for free rotation about fixed shaft 92 by needle bearings 93. Eight (8) arms 111 are pivotally mounted to hub 114 through pins 115. Each of the arms has a V-belt engaging groove. The arms further include guide pins 116 that project outwardly from each side of the arms (only one side being visible in FIG. 12) in the axial direction relative to fixed shaft 92. Pins 116 are received in slots 117 of side cam plates 118 and 119. Side cam plates 118 and 119 are mounted on hub 114 for free relative rotation with respect to the hub. Helical springs 124 and 125 spring bias arms 111 outwardly by applying a torque to plates 118 and 119, which in turn forces arms 111 outwardly through engagement of pins 116 in grooves 117.

Driven pulley 91 includes a hub 127 that is mounted for free rotation about fixed shaft 94 by needle bearing 95. Eight (8) arms 128 are pivotably mounted to hub 127 through pins 129. Each of the arms has a V-belt engaging groove. The arms further include four guide pins 130 and four guide pins 134 (two of each being visible in FIG. 12) that extend outwardly from each side of the arms, only one side of the arms being visible in FIG. 12. Pins 130 and 134 are received in slots 131 of side cam plates 132 and 133. Side cam plates 132 and 133 are mounted on hub 127 for free relative rotation with respect to the hub. No helical springs are present in the driven pulley to urge arms 128 inwardly. As part of the invention, arms 128 of the driven pulley expand from their contracted position as arms 111 of the drive pulley contract without the need for helical springs to bias arms 128 inwardly.

Spring bars 135 are provided to limit the outer most extent of travel of the arms 128 of the driven pulley 91. The spring bars are anchored in bores in hub 127 and project outwardly along four of the eight slots 131 adjacent the sides of plates 132 and 133. As arms 128 pivot outwardly, pins 134, which are longer than pins 130, abut spring bars 135 to limit the outermost extent of the four arms having pins 134. This results in the torque from V-belt 113 being transmitted to hub 127 through the four arms by way of pins 134 and spring bars 135. This permits the entire torque being transmitted from drive pulley 90 to driven pulley 91 to be transferred equally through spring bars 135 when arms 128 of the driven pulley are fully expanded. Further, spring bars 135 are positioned such that pins 134 move freely within slots 131 until the arms of the drive pulley are fully contracted and the arms of the driven pulley are therefore fully expanded. For this position, maximum tension in V-belt is maintained. Therefore, spring bars 135 serve to limit the maximum tension applied to V-belt 113 and to limit the bending stress in the arms regardless of the input torque applied to drive pulley 90, when drive pulley 90 is in its contracted position.

Figure 13:
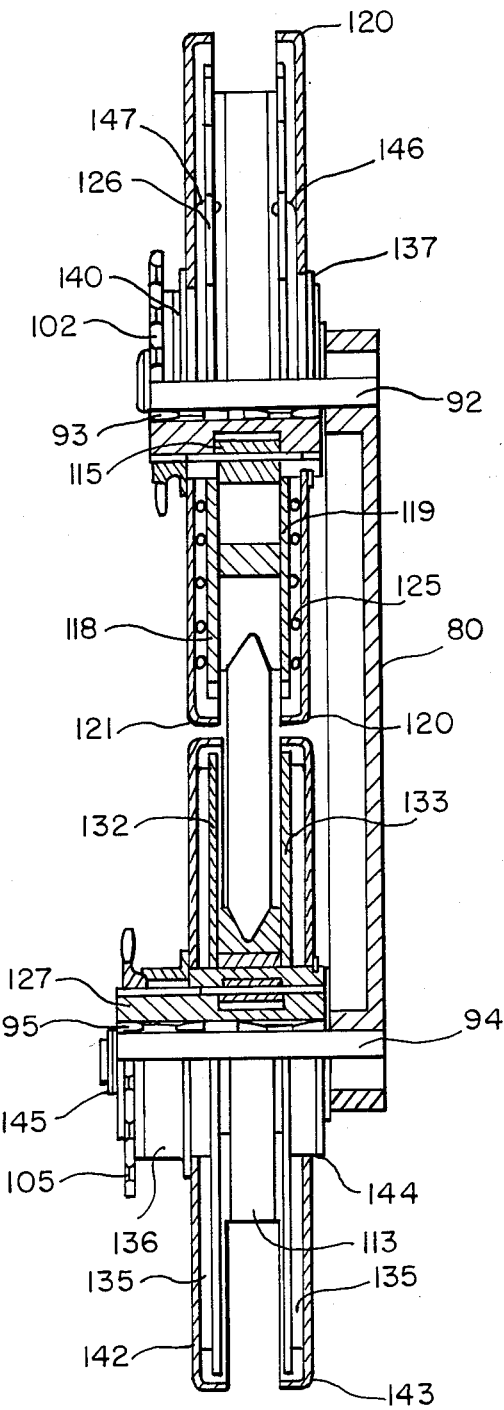
FIG. 13 is an end view partly in section of the transmission and bracket assembly of FIG. 11.

In FIG. 13, an end view partly in section of the transmission of FIG. 11 is shown. Fixed shafts 92 and 94 are mounted in cantilever support to bracket 80. Spaced between driven pulley 91 and sprocket 105 on hub 127 is a spacer 136 that provides for separation between the sprocket and the pulley. As shown in FIG. 12, a spacer 140 is also provided for drive pulley 90. Spacer 140 serves to provide clearance for the roller chain between sprocket 102 and the pulley. Spacer 136 is wider than spacer 140 so that chains 101 and 106 are axially separated in relation to bracket 80.

Preferably, sprocket 102 has left hand threads and is tightened on hub 114 against spacer 140. The left hand threaded connection between sprocket 102 and hub 114 ensures that the driving force applied to the sprocket through the chain tightens the threaded connection. Spacer 140 has a peripherally extending flange portion that abuts outer cover 120. A retaining ring 137 is provided to retain outer cover plate 121 on the other side of the drive pulley. A snap ring 138 is provided to retain the pulley and sprocket upon shaft 92.

Sprocket 105 is threaded onto hub 127 of the driven pulley. Preferably, sprocket 105 has right hand threads for tightening the sprocket on the hub against spacer 136. Spacer 136 has a radially extending flange portion that retains outer cover plate 142 on hub 127. Outer cover plate 143 of the driven pulley is retained by a retaining ring 144. A snap ring 145 is provided to hold the driven pulley hub and sprocket assembly in place on shaft 94. Sprockets 102 and 105 are preferably as small as practical each having about 13 teeth. This causes the driven pulley to rotate at over three times the speed of the pedals and consequently reduces the torquest being handled by the transmission by a third or more. The consequences of this are very important in allowing the smallest and lightest possible design of the transmission. Normally the wheel sprocket will have more than twice the number of teeth of the sprocket as the driven pulley.

This permits an overall bicycle speed ratio ("gear") to be that desired by the rider.

Figure 15:
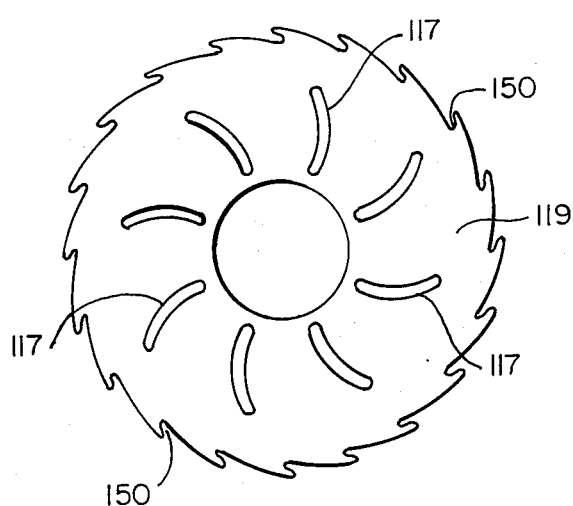
FIG. 15 is a side view of one of the side cam plates of the drive pulley of the transmission of FIG. 11.

Normally, the arms of the drive pulley are expanded to their outer most position and the arms of the driven pulley are contracted to their contracted most position. This relationship is maintained through the spring bias of helical springs 124 and 125. One end of the helical springs is anchored in hub 114, for example, bore 151 shown in FIG. 12 for spring 125. The other end of springs 124 and 125 are provided with bent end or hook shaped end portions 146 and 147, respectively. The bent end portions are adapted to engage one of a plurality of notches 150 located about the periphery of side cam plates 118 and 119, as shown in FIGS. 12 and 15. The helical springs bias plates 118 and 119 in rotation relative to hub 114, in a clockwise direction, as viewed in FIG. 12. Through the engagement of pins 116 and slots 117, the arms are urged to pivot outwardly. This biasing torque applied to the arms through the cam plates 118 and 119 by the helical springs can be adjusted by positioning spring end portions 146 and 147 in an appropriate one of notches 150.

As the input torque is applied to drive pulley 90 through sprocket 102, the torque is applied to counteract the biasing torque that keeps the arms in the expanded position. When the input torque to the drive pulley exceeds the biasing torque on the arms, rotation of side plates 118 and 119 relative to hub 114 occurs. Preferably side plates 118 and 119 rotate approximately 110° relative to hub 114 in order to achieve the full range of speed ratio change. As the side plates rotate, arms 128 of the driven pulley expand. The speed ratio changes as the pulleys change in diameter. If the slots 117 of the side plates 118 and 119 of the drive pulley are straight, then the speed ratio change is not linear. Since a linear speed ratio change is desired, however, slots 117 are curved for reasons explained in greater detail hereinafter.

Figure 16:
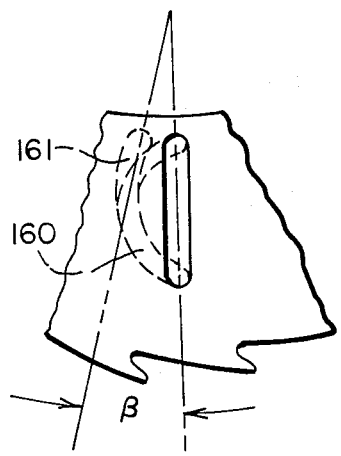
FIG. 16 is a side view of an enlarged section of the cam side plate of FIG. 15 showing alternative embodiments of the guide slots.

With reference to FIG. 16, one of the side cam plates 119 of the drive pulley is shown. In full lines, a straight slot is shown and in dashed lines two curved or arcuate slots 160 and 161 are shown. The curve of slot 160 represents the theoretical curve for a slot in the drive pulley side cam plates that produces linear speed ratio change as a function of cam plate relative angle of rotation for the overall range of speed ratio change provided by the transmission. As a result of curving the slots, the side cam plates rotate relative to the hub at a greater rate when the arms first begin to pivot inwardly than when the arms pivot inwardly from a one-half expanded position. Similarly, as the arms pivot inwardly from the one-half expanded position, the side cam plates rotate relative to the hub at a lesser rate than when the arms first pivot inwardly. This has the effect of displacing the spring 124 and 125 a greater distance as the arms first begin to pivot inwardly than would occur if the arms pivoted inwardly under the guidance of a straight slot. As a result, the springs feel stiffer when the transmission first changes the speed ratio. This increases the effectiveness of the springs and therefore the size of the springs can be reduced.

Slot 161 shown in FIG. 16 presents a preferred curved slot design for a drive pulley constructed according to the invention. As compared with the straight slot, curved slot 161 (like curve slot 160) causes the side cam plates to be angularly displaced at a rate faster than would occur if the arms were guided by straight slots. Further, the radially outward most end of slot 161 is angularly displaced from the end position of both the straight slot and slot 160 by an angle $\beta$. This has the effect of linearizing the speed ratio change over the first two-thirds of the overall range of speed ratio change and especially over the first one-half of the range, while increasing the input torque necessary to achieve the last one-third of the range of speed ratio change. In a preferred embodiment, the curvature of slot 161 provides for fifteen (15) degrees more rotation of side cam plates 118 and 119 than would occur if either the straight slot or slot 160 were used. The additional fifteen degrees of plate rotation has the effect of increasing the compression of helical springs 124 and 125 to increase the required input torque necessary to achieve the last third of overall range of speed ratio change.

In driven pulley 91, side cam plates 132 and 133 include straight slots 131. There is no need to provide curvature in slots 131 since they serve simply to space the arms equally. The driven pulley does not include helical springs and the arms of the driven pulley merely expand to maintain belt tension in response to the belt force transmitted by the V-belt.

A V-belt transmits power through its contact friction with a pulley. In the case of the individual arms of this transmission, the friction tends to retard sudden position changes of the arms during a single cycle of rotation, but position changes and therefore speed ratio change can occur quickly during rapid rotation. That the speed ratio tends to remain constant during a single cycle of rotation has the advantage that the transmission does not respond to the cycling changes in power for each pedal stroke, but rather tends to stay in the speed ratio represented by the maximum force for each pedal stroke.

Obviously, many modifications and variations of the present invention are possible in light of the above teachings. Thus, it is to be understood that within the scope of the appended claims, the invention may be practiced then as specifically described.

I claim:

1. An automatic transmission for a cycle having a frame, front and rear wheels wherein one of said wheels is a driven wheel, axle means mounted on said frame for supporting said driven wheel in rotation about a first axis of rotation, a first sprocket mounted to said driven wheel for fixed rotation therewith, a chain wheel mounted to said frame and journalled for rotation about a second axis of rotation, and pedal means for driving said chain wheel in rotation, comprising:

a transmission mounting bracket having first and second parallel shafts and means for mounting said bracket to said frame, said mounting means including means for receiving said axle means, and means or engaging said axle means for tightening said bracket against said frame;

a drive pulley and a driven pulley supported by said first and said second shafts respectively and mounted for free relative rotation with respect to said bracket;

said drive pulley having a hub and a second sprocket drivingly connected to said drive pulley for fixed rotation therewith;

said driven pulley having a hub and a third sprocket drivingly connected to said driven pulley for fixed rotation therewith;

each of said pulleys including a plurality of arms having a first end pivotally mounted to the respective one of said hubs, and each of said arms having an annnular drive surface portion opposite said first end, each said annular drive surface portion of each of said arms together constituting an annular drive surface for supporting an endless flexible transmission belt passed over said pulleys for transmitting torque from said drive pulley to said driven pulley;

means for varying the diameter of said drive pulley annular drive surface between an expanded position and a plurality of contracted positions including means for constantly biasing said drive pulley toward said expanded position by applying a predetermined biasing torque through said biasing means to each of said arms, and means for contracting said drive pulley to said plurality of contracted positions from said expanded position against said biasing means in response to a torque exceeding said predetermined torque applied to said drive pulley through said second sprocket and transmitted to said driven pulley through the belt;

means for varying the diameter of said driven pulley annular drive surface between a contracted position and a plurality of expanded positions;

means for expanding said driven pulley to said plurality of expanded positions in response to a decrease in diameter of said drive pulley;

said biasing means producing a belt force being transmitted to said driven pulley through the belt;

said diameter varying means of said driven pulley causing said driven annular drive surface to contract toward said contracted position from said expanded positions solely in response to said belt force;

said mounting bracket having a bracket portion extending rearwardly of said bracket mounting means for supporting said drive pulley on said first shaft in position rearwardly of said axle means such that said axle means in positioned between said chain wheel and said drive pulley;

a first chain engaging said second sprocket and said chain wheel for transmitting torque from said chain wheel to said drive pulley; and a second chain engaging said third sprocket and said first sprocket for transmitting torque from said driven pulley to said driven wheel, whereby the speed ratio between said chain wheel and said driven wheel is automatically varied in response to a torque exceeding said predetermined torque applied to said chain wheel through said pedal means and transmitted to said drive pulley through said first chain.

2. The automatic transmission as claimed in claim 1, further comprising:

said axle means including an axle having a threaded end portion;

said means for receiving said axle means including an elongated slot in said bracket for receiving said threaded end portion of said axle, and said means for engaging said axle means including axle nut means theadable onto said axle threaded end portion for tightening said bracket to said frame;

said bracket including a first arm portion supporting said first shaft and extending rearwardly from said slot, said axle, and said chain wheel such that said axle is positioned between said drive pulley and said chain wheel and further such that said first, said second and said third axes of rotation are substantially colinear with a line intersecting each of said axis perpendicularly.

3. The automatic transmission as claimed in claim 2, further comprising:
said bracket including a second arm portion supporting said second shaft extending rearwardly and downwardly from said slot; and
a stabilizer bar having opposite ends connected to said second arm portion at one of said ends and to said frame at the other of said ends.

4. The automatic transmission as claimed in claim 1, further comprising;
said means for varying the diameter of said drive pulley angular drive surface including a plurality of arms of unitary construction, each of said arms having first and second ends, a radially extending arcuate portion interconnecting said ends, and a drive surface portion at said second end suitable for accommodating the belt;
said hub including means for pivotally connecting each of said arms near said first end to said hub at equal angularly spaced positions along the periphery of said hub such that in said contracted position said drive surface portion of each of said arms contacts one another to form an annular drive surface having a minimum pulley diameter, and further such that in said expanded positions said arms pivot outwardly to form a segmented annular drive surface having a pulley diameter greater than said minimum diameter; and
means for guiding the pivoting of said arms inwardly and outwardly between said contracted position and said expanded positions.

5. The automatic transmission as claimed in claim 4, further comprising:
said means for varying the diameter of said driven pulley angular drive surface including a plurality of arms of unitary construction, each of said arms having first and second ends, radially extending arcuate portion interconnecting said ends, and a drive surface portion at said second and suitable for accommodating the belt;
said hub including means for pivotally connecting each of said arms near said first end to said hub at equal angularly spaced positions along the periphery of said hub such that in said contracted position said drive surface portion of each of said arms contacts one another to form an annular drive surface having a minimum pulley diameter and further such that in said expanded positions said arms pivot outwardly to form a segmented annular drive surface having a pulley diameter greater than said minimum diameter; and
means for guiding the pivoting of said arms inwardly and outwardly between said contracted position and said expanded positions.

6. The automatic transmission as claimed in claim 5, further comprising:
said arms having axially opposed surfaces;
each of said guiding means of said drive pulley and said driven pulley including plate means mounted on said hub for free relative rotation with respect to said hub adjacent each of said opposite surfaces of said arms;
each of said arms of said drive and said driven pulleys having a guide pin having opposite ends projecting outwardly from each of said opposite surfaces;
said first and said second plate means of said drive pulley including a plurality of axially aligned, radially extending arcuate slots, each said slot receiving a respective one of said opposite ends of said pins for maintaining equal spacing between said arms as said arms pivot inwardly and outwardly between said first and second plate means; and
said first and said second plate means of said driven pulley including a plurality of axially aligned radially extending straight slots for receiving a respective one of said pins for maintaining equal spacing between said arms as said arms pivot inwardly and outwardly.

7. The automatic transmission as claimed in claim 6, further comprising:
said biasing means including first and second helical wire springs having opposite ends of each of said first and said second plate means, one of said ends being anchored to said hub and the other of said ends having a hook shaped end portion; and
means for adjusting the biasing torque of said helical springs including each of said first and said second plate means having notches along the periphery of said plates for receiving a respective one of said hook shaped end portions of each of said helical springs, whereby said predetermined biasing torque of said helical springs can be set by positioning each of said hook shaped end portions of said helical springs within one of said notches of said first and said second plate means respectively.

8. The automatic transmission as claimed in claim 6, further comprising:
said driven pulley including limit means for limiting the outermost extent that said arms can pivot outwardly.

9. The automatic transmission as claimed in claim 8, wherein said limit means comprises at least two pairs of spring bars having opposite ends, one end of each of said spring bars of each of said pairs being anchored to said hub adjacent said first and said second plate means respectively, and the other end of each said spring bars of each of said pairs being positioned adjacent the respective one of said opposite ends of said pins when the corresponding one of said arms pivots outwardly to the most expanded position of said driven pulley.

10. The automatic transmission as claimed in claim 7, wherein each of said plurality of arms of each of said drive and said driven pulley includes eight said arms.

11. The automatic transmission as claimed in claim 2, wherein said first and said second parallel shafts are mounted in cantilever support from said bracket, said shafts extending outwardly from said bracket.

12. The automatic transmission as claimed in claim 11, further comprising:
first spacer means positioned between said third sprocket and said driven pulley such that said third sprocket extends outwardly from said bracket a first distance; and
second spacer means positioned between said second sprocket and said drive pulley such that said second sprocket extends outwardly a second distance less than said first distance such that the run of said chain does not interfere with the run of said second chain.

13. The automatic transmission as claimed in claim 1, further comprising:
stabilizer bar means connected between said mounting bracket and said frame for stabilizing the mounting of said mounting bracket to said frame.

14. The automatic transmission as claimed in claim 1, wherein said first shaft is supported on said bracket portion in a position for supporting said drive pulley in relation to said axle means such that said first chain passes over and passes under said axle means in driving connection between said drive pulley and said chain wheel.

* * * * *